Feb. 26, 1929.
C. B. MILLS
1,703,243
ICE CREAM MOLD
Filed Aug. 30, 1923
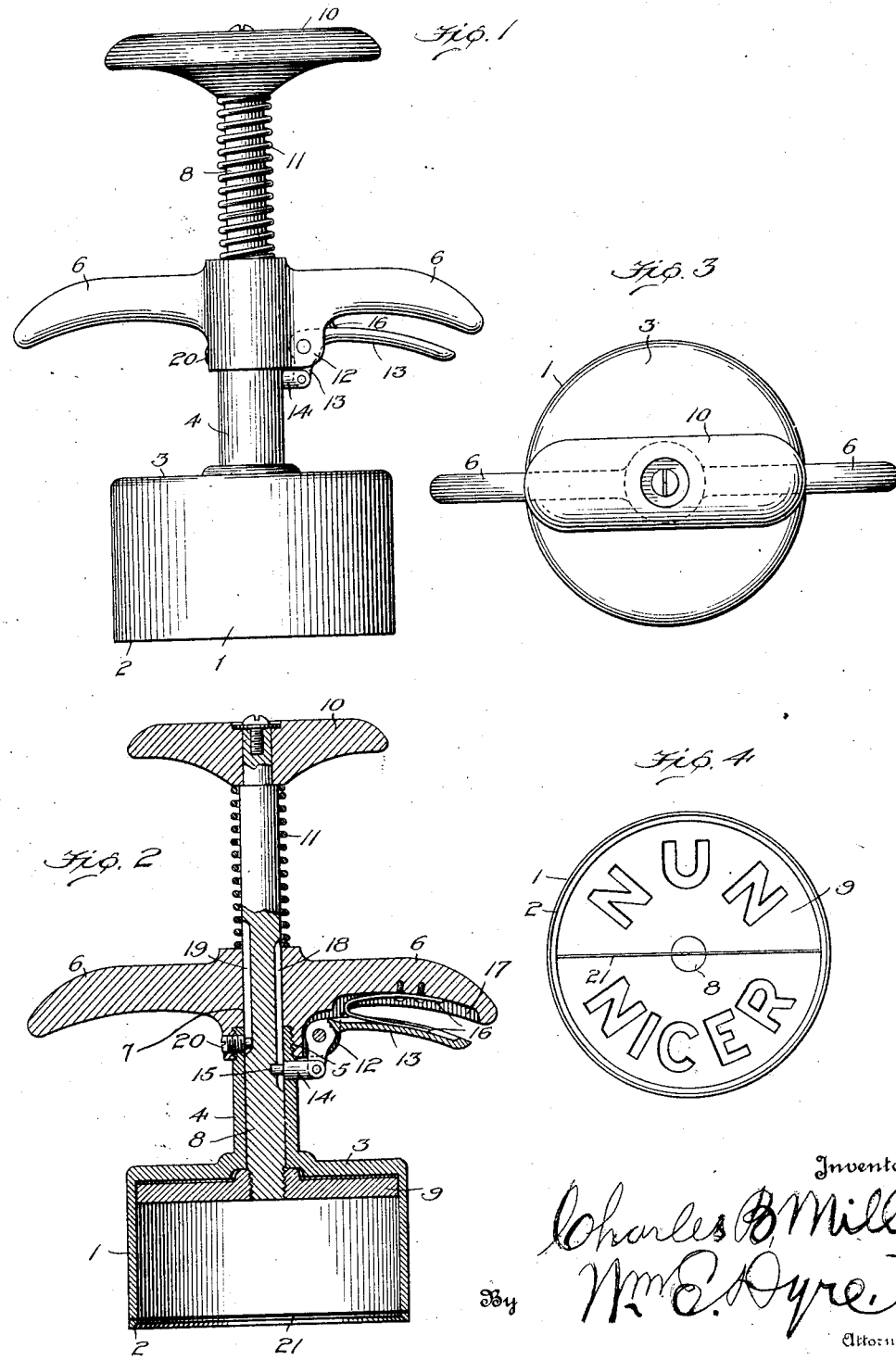

Patented Feb. 26, 1929.

1,703,243

UNITED STATES PATENT OFFICE.

CHARLES B. MILLS, OF FREDERICKSBURG, VIRGINIA; BRINDLEY J. MILLS ADMINISTRATOR OF SAID CHARLES B. MILLS, DECEASED.

ICE-CREAM MOLD.

Application filed August 30, 1923. Serial No. 660,113.

My invention relates to ice cream dishers or dippers, and has for an object the production of implements of the class indicated, by agency whereof a fixed quantity of frozen cream, custards, ices, or other like substances, may be instantly separated from a larger body, and as quickly deposited in a suitable receptacle for use, free from contact with human hands, and without the employment of any other instrumentalities.

With the foregoing and other objects in view the present invention will be hereinafter particularly described, and then pointed out by the claim following.

In the accompanying drawings which form part of this application for Letters Patent, and whereon like numerals indicate corresponding parts in the several views:

Figure 1 is a side elevation of my complete invention;

Figure 2 is a vertical section taken centrally through the structure;

Figure 3 is a top plan view; and

Figure 4 is an inverted plan.

Reference being had to the drawings and numerals thereon, 1 indicates the body of a cylindrical or inverted cup-shaped cutter and mold having its lowermost edge relatively sharpened as at 2, and provided at its upper end 3, with a vertical tubular neck 4 screw threaded upon its upper end as at 5.

Screwed upon the end of said tubular neck 4 as at 5, is a transverse cross-bar or handle 6, having a central perforation 7 corresponding and registering with the interior dimensions of the neck 4 aforesaid.

Passing centrally through perforation 7 of the laterally extending handle 6, and through the hollow interior of neck 4 into the interior of the cutter 1 is a reciprocating piston or plunger rod 8, upon the lower end of which is securely threaded a circular disk or plunger head 9 corresponding circumferentially with the interior dimensions of the mold or cutter 1.

Upon the opposite or outer end of plunger rod 8 is securely attached an elongated push-bar 10 by means of which plunger head 9 is projected when occasion requires, while interposed between said push-bar 10 and the shouldered upper surface of handle 6 is a compression spring 11 coiled loosely around the rod 8 as a means of normally retaining the plunger rod distended and the plunger head 9 housed as indicated by Figure 2 of the drawings.

Depending from one side of the operating handle 6 is a pair of lugs 12, 12, between which, as best shown by Figure 2, is pivotally mounted a bell-crank lever 13, provided with a reciprocating latch 14 for engaging a seat or pocket 15 in plunger rod 8 when the latter is in its raised or normal position. The said bell-crank 13 is in turn retained in its normal position by agency of a leaf spring 16 interposed between said lever and the recessed under surface 17 of the handle 6.

Above and below the latch depression or pocket 15 rod 8 is grooved as at 18 to form a run-way for latch 14 when out of engagement, and the opposite side of this same rod 8 is correspondingly grooved or splined as at 19 to receive a set-screw or stop-pin 20 entering from the neck of handle 6, and serving to prevent a relative rotation of said handle and push-rod members, as also to limit the longitudinal movement of the latter.

At its lower extremity adjacent its sharpened edge 2 the cutting mold member 1 is crossed diametrically by a tense straight edge or wire 21, to assist in severing a measured and molded portion of ice cream or other substances from the original mass as will now appear in a brief statement of operation.

In serving ice cream for example from a freezer it is the practice to introduce into the body of cream my improved disher or dipper, the advanced beveled edge 2 cutting its way until the entire cutter or measuring mold is filled with a cylindrical block corresponding in shape with its interior dimensions. One half rotation, or more, of the entire implement by agency of its operating handle 6 causes the straight edge or wire 21 to neatly sever the molded block from the stock supply, whereupon the dipper and contents are removed to the place of serving.

Operation of the bell-crank lever 13, against the resistance of its spring 16, now withdraws latch 14 from its seat 15 and releases plunger rod 8. With fingers beneath the transverse cross bar or handle 6 the operator then exerts pressure from palm of the same hand to the elongated push-knob 10, whereupon the plunger rod 8 is advanced until arrested by engagement of set-screw or stop-pin 20 in the upper closed end of its slot or spline 19 by which time the disk plunger head 9 has ejected the measured block of cream in two semi-cylindrical sections.

This operation may be repeated rapidly with great accuracy and precision, and it is quite obvious that the interior shape of both mold and plunger head may be varied greatly to produce blocks of varying shape, size and configuration without departing from the spirit of my invention.

Moreover, it will be noted, as best shown by Figure 4, that the face of plunger head 9 may be variously ornamented, configured or lettered, either in relief or in intaglio, so as to imprint upon, or in, the surface of the molded blocks served, the counterpart of such configuration or letters. For example, plunger head 9 may thus be caused to print upon the surface of a block of ice cream the word Velvet, or vaious other plunger heads may be readily substituted bearing other trade-marks, or trade-names, or the names of other manufacturers according to requirements, it being only necessary to unscrew one plunger head 9, and to substitute another bearing the desired legend.

I claim—

In an ice cream cutter, mold and server, the combination of an inverted hollow body surmounted by a tubular plunger guide, a plunger rod reciprocally mounted in said guide, an operating handle projecting laterally from said guide, a push bar on the projecting end of said rod and a plunger head on the opposite end thereof, a longitudinal groove having a pocket near its lower end formed in said rod, a latch carried by said operating handle adapted to travel in said groove, a spring to urge said latch into said pocket, and means for withdrawing said latch from said pocket to allow relative axial movement of said rod and guide but prevent their relative rotation.

In testimony whereof I affix my signature.

CHARLES B. MILLS.